United States Patent [19]

Lajh

[11] 4,295,883
[45] Oct. 20, 1981

[54] DEVICE AND METHOD FOR INTRODUCING GASES INTO MOLTEN METAL

[75] Inventor: Rajko Lajh, Sierre, Switzerland

[73] Assignee: Swiss Aluminium Ltd., Chippis, Switzerland

[21] Appl. No.: 163,177

[22] Filed: Jun. 26, 1980

[30] Foreign Application Priority Data

Jul. 10, 1979 [CH] Switzerland ............... 6447/79

[51] Int. Cl.³ .................................................. C22C 1/02
[52] U.S. Cl. ...................................... 75/68 R; 75/93 E; 266/218; 266/220; 266/208
[58] Field of Search ............. 75/68 R, 93 E; 266/218, 266/220, 208

[56] References Cited

U.S. PATENT DOCUMENTS

| | | | |
|---|---|---|---|
| 3,715,112 | 2/1973 | Carbonnel | 266/220 |
| 3,895,937 | 7/1975 | Gjosteen et al. | 75/68 R |
| 4,091,971 | 5/1978 | Tinnes | 266/218 X |

Primary Examiner—M. J. Andrews
Attorney, Agent, or Firm—Bachman and LaPointe

[57] ABSTRACT

Gases can be introduced in a finely divided form into molten metal using a jet-mixing facility which is designed on the Venturi principle and is made of a suitable refractory material. Melt flow rates of 2–100 m/s are measured in the cylindrical center piece of this mixer, and gas is sucked in at a reduced pressure of 0.05 to 0.9 bar. By means of this process an injector efficiency (ratio of throughput of propellant to throughput of purifying medium) of 3.75–4.0 is achieved.

13 Claims, 5 Drawing Figures

DEVICE AND METHOD FOR INTRODUCING GASES INTO MOLTEN METAL

BACKGROUND OF THE INVENTION

The present invention relates to a device for introducing gases into molten metal and relates also to their operation.

In many metallurgical operations gas is introduced into a charge of molten metal. Some of these operations are carried out at atmospheric pressure, e.g. degassing, mixing a melt with variable additions or reactive slags, or introducing a gas in view of changes in the metallographic structure of the treated metal after casting. Other operations are carried out at reduced pressure, for example vacuum-degassing by introducing a flushing gas. The total volume of gas used can vary in other areas, for example, between 60 and 600 liters per ton of treated aluminum or 30 to 300 liters per ton of steel.

A frequently used method is to introduce a gas into the melt via a lance dipping into the melt. This lance, which is usually provided with a protective coating of refractory material, is connected via a reduction valve to a conventional container of compressed gas. The lance, however, provides poor distribution of the gas in the melt. It also cools the melt somewhat and is subject to a relatively fast rate of wear so that the refractory material breaks off easily, giving rise to undesired inclusions in the metal.

The suggestion has been made to provide porous refractory parts on the base or walls of the container (holding crucible etc.) and to connect the inner face of these parts to a source of compressed gas which then enters the melt via the pores in them. Known are porous refractory elements which can be incorporated in the walls of the container and provide adequate sealing. It can happen however that damage occurs at some part of the porous element or the joint between the element and the rest of the container wall resulting in an improper seal. Although such cases occur relatively seldom in practice, when they do, they cause a disastrous amount of damage to the installation.

The object of the present invention is to find a device and a method to introduce gases into molten metal such that a maximum gas/melt interface is achieved, therefore ensuring as complete as possible reaction of the gas with the impurities in the melt, which is equivalent to achieving a maximum efficiency in the use of the gas introduced to the melt. In achieving this the disadvantages of the present state of the art should be avoided as much as is possible i.e. the poor gas distribution observed when using lances should be improved upon, contamination of the melt by material from the lance prevented and the cooling of the melt by the gas introduced should be reduced. Also, the difficulties which occur on introducing gas via porous bodies in the wall of the container should be overcome, in particular loss of gas and metal through cracks and gaps between the wall and the porous elements. Such a process should allow the melt to be treated with an optimum mixture of gases which are expensive or potentially hazardous; this allows the consumption of such gases to be reduced, at the same time maintaining the same quality of purified melt.

SUMMARY OF THE INVENTION

The foregoing object is achieved by way of the present invention which:
(a) features a fluid gas-jet-mixing facility with a conical inlet for the melt, a center piece for the mixing process and a conical diffuser for the mixture,
(b) that the cone angle of the conical diffuser is 7° to 15°, preferably 9°,
(c) that the hollow, cylindrical center piece features hollow channels for the passage of a gas or gas mixture,
(d) that the ratio of the diameter $d\phi$ of the centre piece to the maximum diameter $D\phi$ of the diffuser and of the conical inlet is 1:4 to 1:6, and
(e) that the ratio of the length of the conical inlet and that of the center piece, measured along the main axis, to the length of the diffuser is 1:5 to 1:8.

The mode of operating this jet-mixing facility is characterized by way of the fact that:
(a) the melt which acts as the propellant is introduced into the facility at an initial pressure of 0.2 to 10 bar, preferably 0.8 bar,
(b) in its center piece the flow rate reaches 2 to 100 m/sec, preferably 20 m/sec, and
(c) as a result of this the gas, which acts as the purifier, is sucked into the melt flowing through the center piece, at a reduced pressure of 0.05 to 0.9 bar, preferably 0.2 bar, developed by the flowing melt.

Such a jet-mixing facility, working on the Venturi pipe principle, facilitates a fine distribution of gas which is superior to that obtained by the present state of the art and results therefore in more efficient use of the gas—at the same time ensuring a quality of purified melt which corresponds to that of a melt purified by the conventional methods. This means that, while producing the same product quality, a considerable amount of flushing gas can be saved. This is of significant economic importance if expensive inert gases or mixtures thereof are used, and of great value in general when the gases are aggressive and could cause problems as far as work place hygiene and the environment are concerned.

Furthermore, the jet-mixing facility of the present invention simplifies handling in that it reduces the number of steps involved in purifying molten metal. It reduces further the amount of dross formed during melt treatment and the metal losses due to surface oxidation.

Finally, mixing facility according to the present invention overcomes to a large degree the operational and material problems of the conventional processes in that there need be no fear of metal losses due to joints between the wall and the inlet elements. The mixing ratio of metal and gas can be adjusted to such a fine degree that the uncontrolled cooling of the melt, which is sometimes observed in lance treatment of the melt, can no longer occur. Also, with the method according to the present invention there need be no fear of material from the lance entering the melt, provided the material for the jet-mixer is properly chosen. In spite of some initial problems in choosing this material it has now been found that aluminum titanate and silicon nitride are exceptionally well suited for this purpose. These materials can be readily shaped to the required degree of precision. They also exhibit the mechanical properties which can withstand the pressures produced in the melt and significantly lower the amount of erosion due to the flowing action of the melt. Satisfactory results can also be obtained with sintered silicon oxide or a combination of asbestos fibers and a binding agent of calcium silicate.

BRIEF DESCRIPTION OF THE DRAWINGS

The present invention will now be explained further by means of exemplified embodiments and with the help of the figures wherein, FIG. 1(a) and (b) Is a schematic representation of the process in the form of a flow chart, showing two different versions of melt treatment after it leaves the jet-mixing facility.

DETAILED DESCRIPTION

Figure 1:
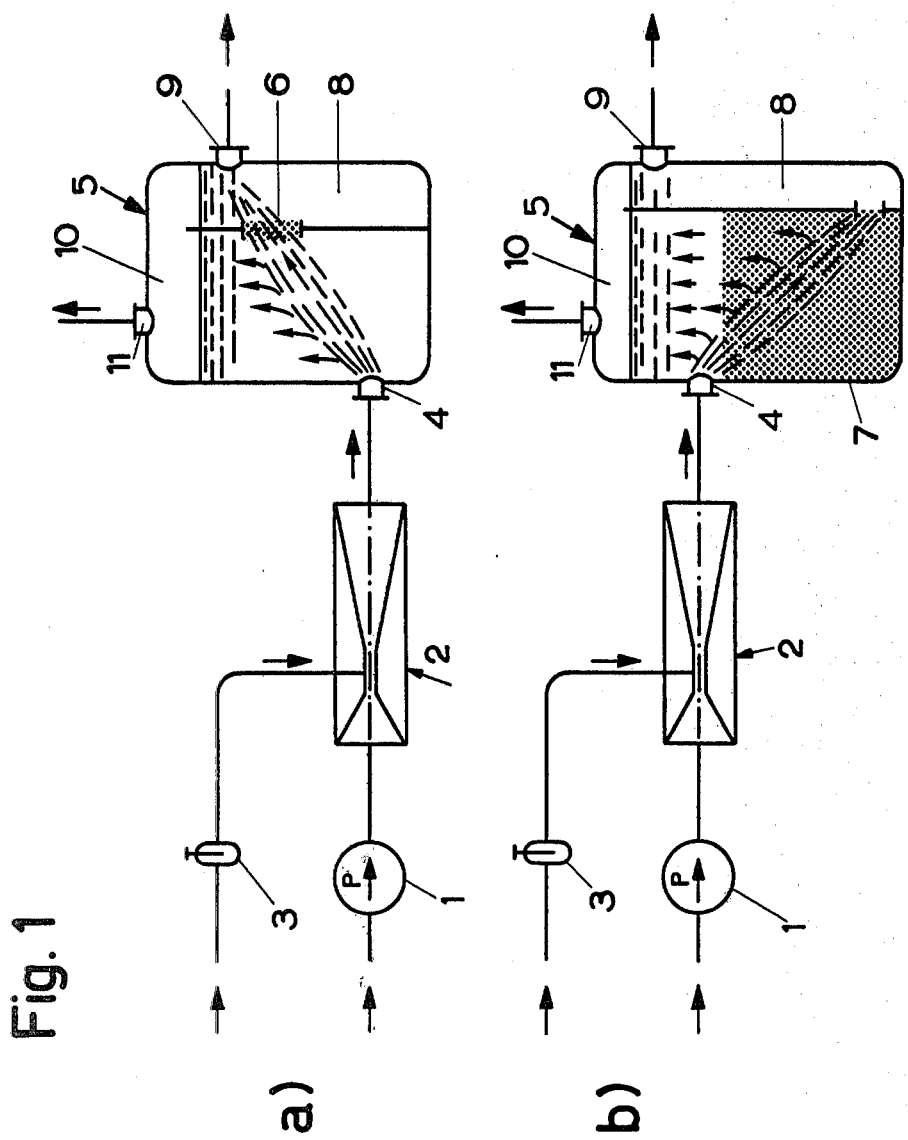

As shown in the flow chart illustrated in FIG. 1, the melt to be treated with gas is forced by means of a pump (1) of conventional design (e.g. an electromagnetic pump able to pump around 4-20 t/hour, such as is used to pump liquid sodium in nuclear power plants) to the conical inlet of the gas/liquid jet-mixing facility (2), and reaches the center piece of this device at a given flow rate and corresponding pressure. The gas enters the flowing metal via a pressure regulating valve (3) as extremely finely divided bubbles as a result of the reduced pressure which prevails in the center piece. The energy due to the flowing movement of the gas mixture is converted back to pressure in the conical diffuser of the jet mixer device (2). The gas mixture enters via the distributor (4) a through-flow container (5) which is at reduced pressure and which serves as a stabilizer. In this container (5) the melt is made to pass either through a suitable ceramic filter (6) (FIG. 1a) or through a suitable loose bed (7) (FIG. 1b) of generally well known composition, and then enters a holding chamber (8) from which it can be led off via an outlet (9) for further application. The gas leaves the melt at a rate which varies according to the fineness of the bubbles, and collects in the upper zone (10) from which it can either be recycled via valve (11) or, if desired, released to the atmosphere after appropriate scrubbing.

Figure 2:
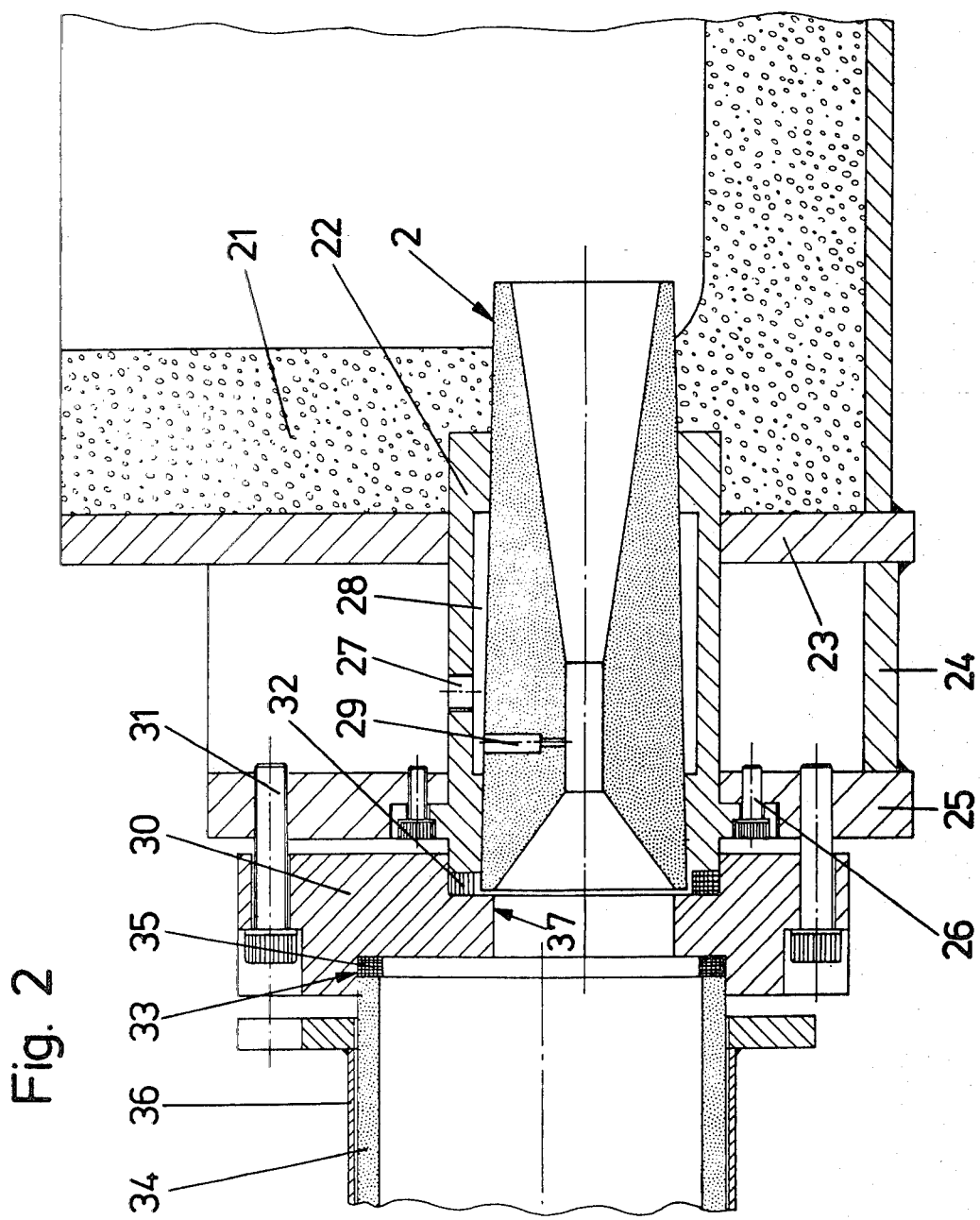
FIG. 2 Is a sectional view through a device for carrying out the invention, showing how the mixing facility is built into the device as a whole.

FIG. 2 shows in detail how the mixer (2) is mounted into the device:

The device which is made of a refractory material fits into a correspondingly shaped recess in the wall (21) of a container which is also made of refractory material. There is also an interlocking action between the flow mixer (2) and the hollow, cylindrically shaped metal casting (22). This latter fits in turn into a corresponding recess in the lining (21) and steel wall (23) of the container. This casting (22) is fixed in this position on the intermediate part (24) and the basically ring-shaped piece (25) by means of threaded bolts (26). The flushing gas enters via opening (27) into the space (28) which is formed by the interior of the hollow cylinder (22), and from there passes through an opening (29) in the mixer (2) into the molten metal flowing through the cylindrical center piece. Instead of the opening (29) other suitable channels can be employed (see FIGS. 3 to 5). By having a slight excess pressure in chamber (28) one can prevent flowing metal from escaping through the opening (29) and the injected gas from being lost through the joints in the device.

The mixer (2) is mounted in the chosen position by means of the casting (30) which is joined by bolts and gasket (32) to another casting (25). On one side the casting (30) features a circular outlet (37) which has the same diameter as the inlet of the mixer (2). On the side facing the pump it has a recess (33) which is rectangular or square in cross section. This piece (30) can be made of a suitable metal or ceramic material.

A pipe (34) which conducts the liquid metal and which is made of refractory material is mounted in the recess (33) with the rectangular cross section, the seal between both parts being made by a gasket (35) of some suitable material (e.g. asbestos or silicon rubber). This pipe (34) is in turn supported by a sleeve (36) made of some suitable metal. The electromagnetic pump (1) is mounted around this pipe (34).

Figure 3:
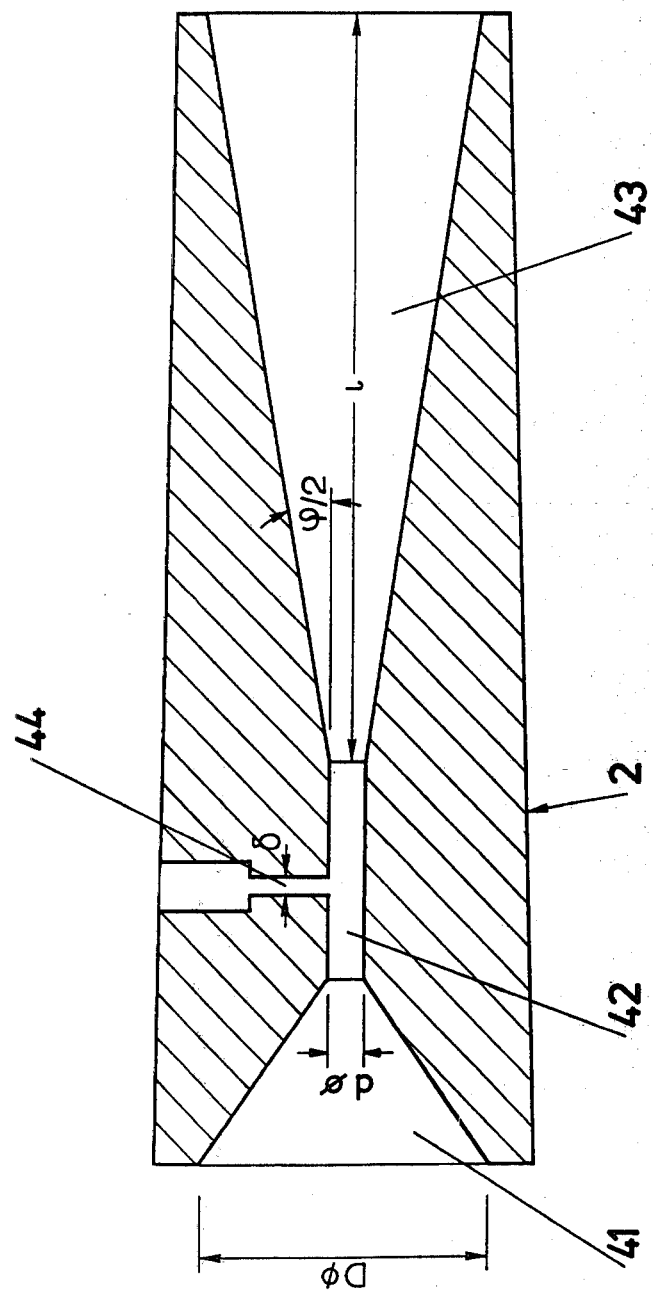
FIGS. 3, 4 and 5 Are longitudinal sectional views through various versions of the mixing facility according to the present invention.
Figure 4:
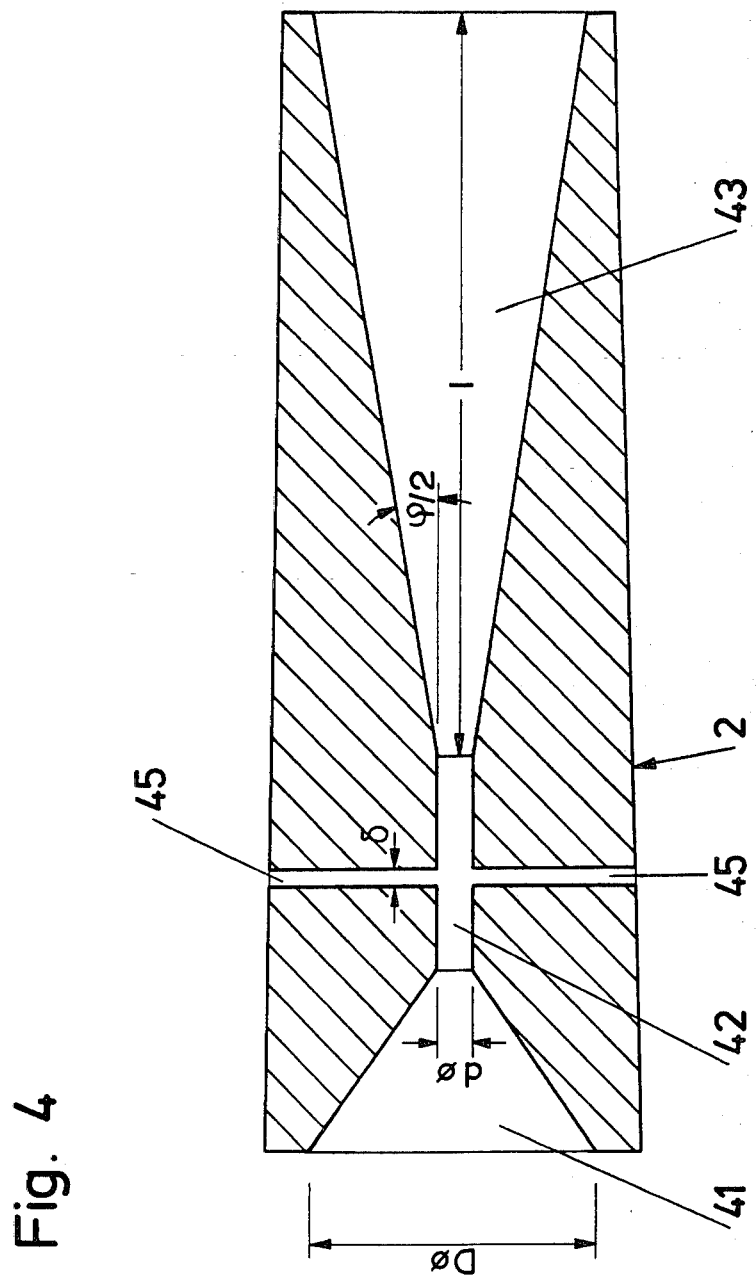
Figure 5:
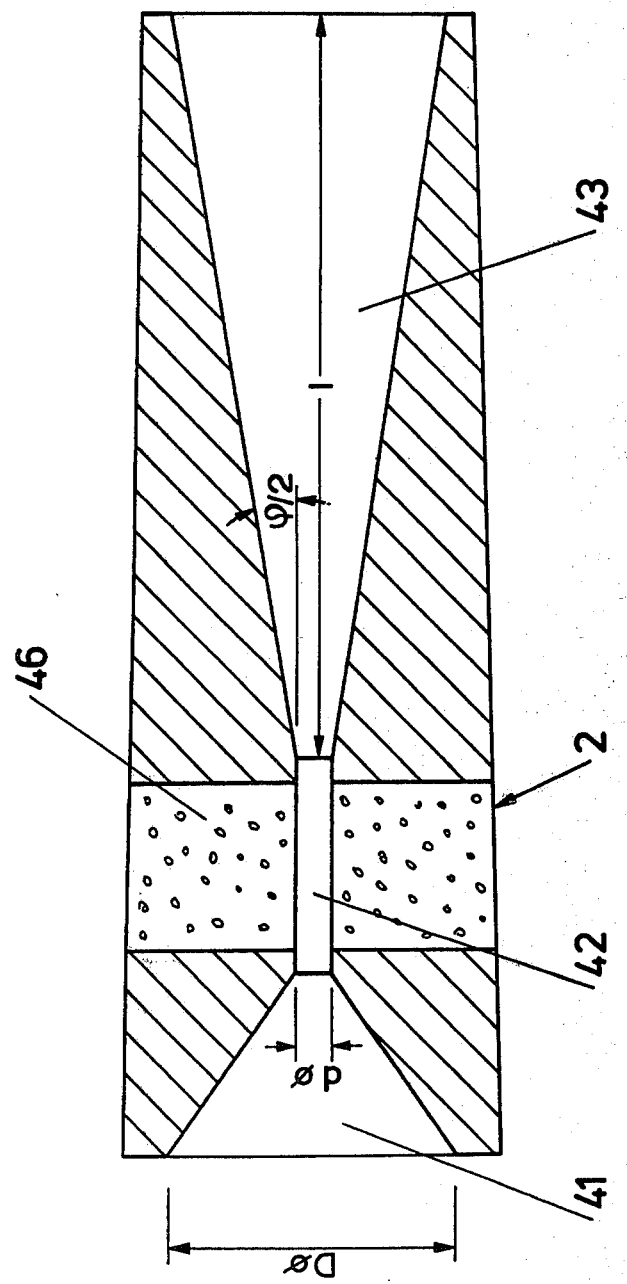

Various versions of the liquid/gas jet-mixer facility (2) are shown in FIGS. 3 to 5. These are all based on the same principle of the Venturi pipe and comprise a conical inlet (41), a cylindrical center piece (42) and a diffuser (43) which are fitted together to a compact device which has cylindrical or blunted cone shape. The center piece (42) which looks like a hollow cylinder is provided with various kinds of channels to conduct the gas away. In the interior the pressure drop in the fluid which acts as propellant produces a sucking action on the fluid or gaseous purifying medium introduced through the hollow channels. This sucking action depends on the difference between the pressure in the purifying medium and the pressure in the propellant in the cylindrical center piece (42) of the mixer. The latter is obtained via the Bernoulli equation from (a) the initial pressure in the propellant before it enters the mixer, which is essentially developed by the pump (1),
(b) from the difference of the square of the flow rate in the propellant before it enters the conical inlet (41) and in the narrow center piece (42) of the mixer.

This change in flow rate also depends basically on the geometry of the mixer which has to be carefully optimized to suit the specific task. This involves avoiding whirlpools in the fluid and trying to obtain a maximum injection efficiency $\eta_T$ which is defined as the quotient of the amount of purifying medium sucked in per unit time $D_F$ and the amount of propellant used per unit time $D_T$, viz., $$\eta_T = D_F/D_T \tag{1}$$

As a result of a series of systematic trials aimed at optimizing the dimensions of the mixer, it has been found useful to choose a ratio of 1:5 to 1:8 for the relationship of the length of the conical inlet and cylindrical center piece (42) (measured along the main axis) to the length of the conical diffuser (43). To obtain suitable flow rates in the cylindrical center piece of the mixer and to ensure an optimum conversion of the flow rate into pressure, the smallest and largest diameters of both the conical inlet and the diffuser should have a ratio of 1:4 to 1:6. For the same reason it has been found advantageous to choose a cone angle for the conical diffuser ($\phi/2$) such that it is 7°–15°, preferably 9°.

Choosing a suitable material for the jet mixer (2) presents considerable difficulty as this is required not only to have a good thermal stability but should also be chemically and mechanically resistant towards fast flowing metal. As was mentioned above, aluminum titanate and silicon nitride have been found to be particularly suitable materials; satisfactory results have also been obtained with sintered silicon oxide and with a composition made up of asbestos fibers and a binding agent of calcium silicate.

The channels for introducing the gas into the center piece (42) of the mixer (2) can also have different forms. In the version shown in FIG. 3 a hole (44) is provided at the center piece (42) at right angles to the main axis of the device. This has a diameter $\delta$ and space to house a gas inlet nipple. If, as shown in FIG. 2, a chamber (28) is provided for introducing the gas, then one or more smooth-walled channels (44,45) can be provided in the cylindrical center piece (42) (FIG. 4). To ensure optimal feed and fine distribution of the gas in the melt, the ratio of the diameter of the cylindrical center piece to the diameter of the opening for introducing the gas should be between 4:1 and 6:1. In this respect it has been found useful to allow the angle at which the channel or channels (44,45) for introducing the gas into the cylindrical center piece of the mixer lie to vary between 30° and 90°.

In such a case the individual channels can also be replaced by a hollow-cylinder-like center piece (46) made of a porous material which is permeable to gases, has an inner radius of $d\phi$ and forms the center piece (42). Inlet, center piece (42 or 46) and diffuser (43) are in this version joined permanently by means of a suitable binder. Porous aluminum titanate or silicon nitride has in particular been found to be a suitable material for such a centre piece (46) (FIG. 5).

1st Example

A melt of primary aluminum of composition corresponding to a 99.5% grade (1100) and at an initial temperature of 720°–760° C. was pumped, by means of an electromagnetic pump, at an initial pressure of 0.2–10 bar, for example 0.8 bar, into the cylindrical center piece (4) of the jet mixer. This mixer had a conical inlet (3) with a cone angle of 30°–35°, a maximum diameter $D\phi = 50$ mm, a cylindrical center piece of diameter $d\phi$ between 6 and 12 mm, for some particular purposes up to 30 mm, and a conical diffuser with a cone angle $\phi/2 = 9°$. The gas used for flushing the melt was argon. This was sucked through a hole (44) of diameter $\delta = 2$ mm into the center piece (42) under the action of the reduced pressure of 0.05 to 0.9 bar, preferably about 0.2 bar, produced by the flowing action of the metal. Similar results were obtained using other inert gases (noble gases, nitrogen) or mixtures of these. Under these conditions the gas was injected as bubbles of diameter less than $10^{-2}$ mm and therefore with an injection efficiency of $$3.75 \leq \eta_T \leq 4.0$$

The gas-treated aluminum melt was passed through a through-flow filter of known design, which acted as a stabilizing space, where the melt was degassed at atmospheric pressure. At this stage it was observed that the bubbles joined up relatively slowly on the way to the melt surface, so that about 50% of the bubbles maintained their original size before being released from the melt. This means that the conditions for a large interaction at the bubble/melt interface are attained and with that very efficient use of the gas employed. The hydrogen content of the aluminum melt treated this way was reduced from around 40 ml $H_2$/100 gr to about 20 ml, which corresponds to a reduction of about 50% from the initial value. This treatment also reduced the concentration of non-metallic inclusions from 33 per $dm^2$ to 9 and from 47 to 12 per $dm^2$, corresponding to a reduction of 70 to 75% from the initial value.

2nd Example

An aluminum melt of the same composition as in the first example was treated under the same conditions with mixtures of argon (or nitrogen) as the carrier gas and up to 5 vol.% of an aliphatic chloro-fluoro-hydrocarbon. The results from these trials are summarized in Table I and show that such an arrangement is able to lower the concentration of dissolved alkali (Na, Li, K) and alkali-earth (Mg, Ca) elements in the aluminum melt to less than 5 ppm.

TABLE I

| Lowering the Na concentration of an aluminum melt by introducing an active gas mixture in the flow-type mixer | | | |
|---|---|---|---|
| Initial melt pressure | | 0.8 bar | |
| Flow rate in the center piece of the flow mixer | | 20 m/sec $\approx$ 12 t/h | |
| Reduced pressure for introducing gas | | 0.2 bar | |
| Initial temperature of melt | | T = 720° C. | |
| | | Concentration | |
| Composition gas mixture | Amount of gas per ton of metal ($Nm^3$) | Initial value (ppm) | End value (ppm) |
| Argon | 0.15–0.2 $Nm^3$/t | 30 | 5 |
| Argon/5% Freon 12 | | 30 | 3.4 |

What is claimed is:

1. A device for introducing gas into a metal melt comprising a fluid/gas-jet-mixing facility having a converging conical inlet, a cylindrical hollow center piece having a passageway of substantially constant diameter and a diverging conical outlet all disposed sequentially along a first axis, said cylindrical hollow center piece being provided with a plurality of channels for passing a gas to said passage, first feeding means for feeding said melt to said converging conical inlet and into said passage such that said melt sucks said gas through said channels and into said passage for mixing said gas with said melt in said passage wherein the angle of said diverging conical outlet measured from said first axis is equal to about 7° to 15°, the ratio of the diameter of said passage to the maximum diameter of both said converging conical inlet and said diverging conical outlet is about 1:4 to 1:6 and the ratio of the length of said converging conical inlet plus the length of said passage to the length of said diverging conical outlet is about 1:5 to 1:8.

2. A device according to claim 1 wherein the angle of said diverging conical outlet measured from said first axis is equal to about 9°.

3. A device according to claim 1 wherein said cylindrical center piece is permeable to said gas.

4. A device according to claim 1 wherein the ratio of the diameter of said passage to the diameter of said channels is 4:1 to 6:1.

5. A device according to claim 1 wherein said plurality of channels are disposed about said first axis at angles of from about 30° to 90° from each other.

6. A device according to claim 1 wherein said hollow channels are in the form of a porous gas permeable material.

7. A device according to claim 1 wherein said facility is made of aluminum titanate, silicon nitride, sintered silicon oxide or a combination of asbestos fibers with calcium silicate as a binding agent.

8. A device according to claim 6 wherein said porous material comprises aluminum titanate or silicon nitride.

9. A process for treating a metal melt with a gas comprising the steps of:
  (a) providing a fluid/gas-jet-mixing facility having a converging conical inlet, a cylindrical hollow center piece having a passageway of substantially constant diameter and a diverging conical outlet all disposed sequentially along a first axis;
  (b) providing a plurality of channels in said cylindrical center piece for passing said gas into said passage;
  (c) feeding said melt into said converging conical inlet at a pressure of about 0.2 to 10 bar such that the flow rate of said melt at said passageway reaches from about 2 to 100 meters per second such that said melt sucks said gas through said channels and into said passageway at a reduced pressure of from about 0.05 to 0.9 bar wherein said gas is mixed with said melt in said passageway.

10. A process according to claim 9 including the step of heating said metal melt to a temperature from about 720° to 760° C. immediately prior to introduction into said facility.

11. A process according to claim 9 wherein said gas does not chemically react with said melt.

12. A process according to claim 9 including the step of providing a noble gas or nitrogen or a mixture of noble gases alone or including nitrogen.

13. A process according to claim 12 including the step of providing a gas mixture of up to 5% by volume of an aliphatic chloro-fluoro-hydrocarbon mixed with an inert carrier gas.

* * * * *